Patented Sept. 2, 1924.

1,507,374

UNITED STATES PATENT OFFICE.

ANNIE S. HEINRICH AND JOSEPH HEINRICH, OF PATERSON, NEW JERSEY.

MANUFACTURE OF ICING.

No Drawing.    Application filed August 3, 1923.  Serial No. 655,543.

*To all whom it may concern:*

Be it known that we, ANNIE S. HEINRICH and JOSEPH HEINRICH, citizens of the United States, residing at Paterson, in the county of Passaic and State of New Jersey, have invented certain new and useful Improvements in the Manufacture of Icings, of which the following is a specification.

This invention relates to the culinary art and in particular to the manufacture of icings for cakes and the like and especially icings used in commercial cake making. It has long been desired to provide an icing which, while having the usual qualities characteristic of a good icing and affecting its taste, texture and appearance, could be put up and shipped in sealed containers and kept for a considerable lapse of time without souring and without becoming hard or friable so that it could not after such lapse of time be spread on a cake, and which would take any kind of flavoring substance without affecting its chief qualities as an icing and would permit its being handled, after application to a cake, without sticking to the fingers. Icing made according to the method hereinafter set forth has been found to answer all these requirements. Describing our invention in detail, we proceed to make the improved icing as follows, the temperatures stated being all Fahrenheit and the proportions given being such that the resultant batch will represent, in quantity, sixteen pounds, approximately:

*First step.*—We first form a beaten fondant in which there will be a crystalline condition but in which a condition of plasticity will be the more pronounced, and also in which the necessary element of all icings—albumen—will be present; these indicate the principal qualities of the fondant, all necessary and tributary to certain qualities which the final product, or improved icing, should have, but as it is a beaten fondant and so more or less porous or cellular, it also has a "body" or stamina imparted thereto. Such a fondant is preferably thus prepared: 2 lbs. of any syrup which will not crystallize when boiled, as corn syrup, ½ lb. of sugar and 4 oz. of water are mixed and then heated to approximately 260°. Then this mixture, which is a liquid, is added while still hot gradually, as in a thin stream, to a mass of two egg whites beaten till thick, and while it is being added the egg whites are beaten, the beating being continued after all of the said liquid has been thus added and until the resulting mixture will cling to the beating implement when withdrawn therefrom (about 15 minutes at summer temperature). Due to the heat of the liquid the egg whites undergo some coagulation, which has the effect of preserving them. Then 3 oz. of some farinaceous substance (by which we mean starchy material in the form of flour or meal), as and preferably tapioca flour, is added to the last mixture and the latter beaten thirty minutes more, or until this mixture has a consistency equal to what it would have were it cooked to 240°, i. e., simulating in elastic sponginess marshmallow candy. The syrup imparts to the fondant the plasticity; the sugar (which undergoes crystallizing under the heat) a crystalline condition, though considerably less manifest than the plasticity, the purpose being to have the finished icing capable of being spread and yet have sufficient of the crystalline constituent present at least to produce a protecting crust thereon, enabling it to be handled without sticking to the fingers; and the farinaceous substance imparts the "body," stiffness or stamina desired, preventing collapse of the fondant, and also the icing when completed, from the sponge-like condition.

*Second step.*—We next prepare a plain fondant formed by a mixture of 10 lbs. of sugar and 2 qts. of water first heated to 240° and then poured on a cooling surface (as a marble slab) to cool as uniformly as possible to about the temperature of the atmosphere. Note that the consistency of this fondant (boiled to 240°) is substantially the same as that of the beaten fondant, though the latter is spongy, or distinctly more porous or cellular than the other.

*Third step.*—We finally add the beaten fondant to the plain fondant and beat them together for approximately forty-five minutes, or until the resulting mixture as the result of the beating assumes an appreciably thinner consistency than either of them initially had, i. e., a final consistency which is about that of peanut butter, and hence capable of being spread.

The product resulting from this last treatment is the improved icing. This icing, when preserved in sealed containers, will keep without souring for many months; it will then still possess the proper consistency for spreading on a cake which it initially has, to wit, about that of peanut butter; it will not harden or become friable when spread on a cake so long at least as the cake itself does not become so stale as to be inedible, though it will on exposure to the atmosphere at once take on a thin crust which both acts to preserve the soft pasty consistency beneath it and prevent the icing from sticking to the fingers when handled; and finally it will take any flavoring materials. As to this last, we are aware that an icing has been proposed which will keep substantially indefinitely when preserved in sealed containers and which may also be spread whenever it is used; but this icing, containing (with sugar, corn syrup and egg whites) gelatine, will not take any oily flavors, like chocolate for example, and it will not form the desirable crust which characterizes our icing when exposed to the atmosphere and which is apparently prevented from being formed (by the sugar crystals that are exposed to the air) by the gelatine absorbing moisture from the atmosphere.

It is of course understood in this art that heating sugar in water above 230° causes crystallization thereof, essential in a fondant.

The first and second of the three steps herein set forth need not necessarily be performed, of course, in the order given.

Having thus fully described our invention, what we claim as new and desire to secure by Letters Patent is:

1. The herein-described method of forming an icing which consists in preparing a beaten spongy fondant containing albumen and a farinaceous substance and having its plasticity more pronounced than its crystalline quality, preparing another fondant of sugar and water heated together and so that the consistency of the second fondant shall be approximately the same as that of the first fondant, and cooling and then mixing and beating together the two fondants until the mixture assumes a soft pasty consistency.

2. The method of preparing an icing which consists in first forming a fondant by mixing corn syrup, sugar and water, heating the mixture thus formed to approximately 260°, adding said mixture, while hot, to egg whites beaten till thick, beating the egg whites while adding said mixture thereto and continuing the beating of the mass thus formed by said mixture and the egg whites till the mass will cling to the beating implement, then mixing with said mass 3 oz. of farinaceous flour and then beating the mixture last named until it has a consistency substantially the same as it would have were it cooked to 240°; then forming another fondant by mixing sugar with water heated to 240° and cooling the mixture thus formed on a suitable cooling surface to approximately atmospheric temperature; and finally adding the first fondant to the second fondant and beating them together until the mixture thus formed of them is capable of being spread, all the proportions being substantially as set forth.

In testimony whereof we affix our signatures.

Mrs. ANNIE S. HEINRICH.
JOSEPH HEINRICH.